United States Patent
Furgerson

(10) Patent No.: US 12,422,991 B2
(45) Date of Patent: Sep. 23, 2025

(54) MEMORY FOLDING SYSTEMS AND METHODS FOR USE IN FREQUENCY BASED TRANSFORMS

(71) Applicant: Raytheon BBN Technologies Corp., Cambridge, MA (US)

(72) Inventor: James L. Furgerson, McKinney, TX (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 220 days.

(21) Appl. No.: 18/205,095

(22) Filed: Jun. 2, 2023

(65) Prior Publication Data

US 2024/0402911 A1    Dec. 5, 2024

(51) Int. Cl.
*G06F 3/06*    (2006.01)

(52) U.S. Cl.
CPC ............ *G06F 3/0613* (2013.01); *G06F 3/064* (2013.01); *G06F 3/0659* (2013.01); *G06F 3/0673* (2013.01)

(58) Field of Classification Search
CPC ...... G06F 3/0613; G06F 3/064; G06F 3/0659; G06F 3/0673; G06F 17/142; H04L 27/26524; H04L 1/0057; G01S 7/356
See application file for complete search history.

(56) References Cited

U.S. PATENT DOCUMENTS

| | | | |
|---|---|---|---|
| 10,416,284 B2 * | 9/2019 | Addison | G01S 7/414 |
| 2003/0142764 A1 * | 7/2003 | Keevill | H04L 27/2678 |
| | | | 714/795 |

OTHER PUBLICATIONS

D. Lau, A. Schneider, M. D. Ercegovac and J. Villasenor, "FPGA-based structures for on-line FFT and DCT," Seventh Annual IEEE Symposium on Field-Programmable Custom Computing Machines (Cat. No. PR00375), Napa Valley, CA, USA, 1999, pp. 310-311, doi: 10.1109/FPGA.1999.803710.

M. Parker, S. Finn and H. S. Neoh, "Multi-GSPS FFTs using FPGAs," 2016 IEEE National Aerospace and Electronics Conference (NAECON) and Ohio Innovation Summit (OIS), Dayton, OH, USA, 2016, pp. 430-436, doi: 10.1109/NAECON.2016.7856843.

* cited by examiner

*Primary Examiner* — Hiep T Nguyen
(74) *Attorney, Agent, or Firm* — CANTOR COLBURN LLP

(57) ABSTRACT

A processing circuit for creating a frequency-based output data from sampled streaming analog input data that is provided in K-deep input data blocks where K is a number of samples per clock cycle. The system includes: a memory unit on the single chip to store data including the sampled streaming analog input data; a processing engine on the single chip that receives the incoming streaming data as a series of K-deep input data blocks and performs a portion a frequency transform on the incoming streaming data to produce processed data. The system also includes a memory controller that causes the processed data to initially be stored by column in the memory unit. The memory controller reads data in the memory out in a rotated manner, provides it to the processing engine so that processing engine creates new processed data and writes the new processed data back into the memory.

21 Claims, 8 Drawing Sheets

MEMORY FOLDING SYSTEMS AND METHODS FOR USE IN FREQUENCY BASED TRANSFORMS

STATEMENT OF FEDERAL SUPPORT

This invention was made with government support under Government Contract No. FA8650-21-C-7031 awarded by DARPA Coho. The government has certain rights in the invention.

BACKGROUND

The present disclosure relates to memory usage and, in particular, to memory usage in place calculations for FFT and CZT applications.

To analyze the spectral content of a signal it is known to use a discrete Fourier transform (DFT). Such a transform can involve several repetitive calculations. To reduce such repetitive calculations an algorithm became known as the fast Fourier transform (FFT) was developed. The FFT usually includes one or more processing elements to compute the FFT in stages.

Similarly, a generalized version of the DFT is called a chirp-Z transform (CZT). It also involves several stages and, in some case, can include some or all of the same stages as an FFT. In both FFT and CZT computations, each stage typically requires accessing data in memory and then writing the results of that stage back into a different memory location. This is due to the fact that some of the stages need the data rotated (e.g., due to matrix algebra operations) relative to a last stage and is referred to as a corner turn.

In some cases, demand for high data rates and long integration times lead to large "streaming" FFT/CZTs in the range 1 million to 1 billion points at >1 GHz. To handle the corner turn for such large volumes of data, a common approach is utilize high-bandwidth memory (HBM). HBM parts are costly, complicated, and can have limited application due to lifespan/thermal environment requirements. Further, the memory is located "off-chip" from the processor (e.g., FPGA) performing the FFT/CZT calculations.

SUMMARY

According to one embodiment of the present disclosure, a processing circuit on a single chip for creating a frequency-based output data from sampled streaming analog input data that is provided in K-deep input data blocks where K is a number of samples per clock cycle is disclosed. The system includes: a memory unit on the single chip to store data including the sampled streaming analog input data; a processing engine on the single chip that receives the incoming streaming data as a series of K-deep input data blocks and performs a portion a frequency transform on the incoming streaming data to produce processed data; and a memory controller that causes the processed data to initially be stored by column in the memory unit, wherein the memory controller is configured to read data in the memory out in a rotated manner, provide it to the processing engine so that processing engine creates new processed data and write the new processed data back into the memory.

In any system herein, the memory unit can include at least M×N memory locations where M is a number of rows in the memory unit and N is the number of columns in the memory unit.

In any system herein, the memory can include K K-groups of memory elements, wherein each K-group includes K-rows of 1-D memory, wherein each K-group is divided into N/K portions and wherein a first memory portion ($C_0$) of a first of the K-groups includes M memory locations.

In any system herein, the processed data is written into the first memory portion ($C_0$) such that each successive data block is written in a successive location of each of the K-1D memory elements.

In any system herein, after the ($C_0$) is full, the processed data is written into a second memory portion ($C_1$) such that each successive data block is written in a successive location of each of the K-1D memory elements in the second memory portion, wherein the second memory portion is a second of the k-groups.

In any system herein, the memory unit includes $C_N$ portions, wherein after each successive ($C_2$ . . . . $C_{(K-1)}$) memory is full, each successive data block is written in a successive location of each of the K-1D memory elements in the successive memory portion until a last memory portion $C_N$ is filled.

In any system herein, the memory controller is configured to read out stored data from the memory unit as either un-rotated or rotated data.

In any system herein, when the data from the memory unit is read out as rotated data, a first read out data block that includes K data elements is formed by reading first locations of each first row of each K-group.

In any system herein, when the data from the memory unit is ready out as rotated data, a second read out data block that includes K data elements is formed by reading Mth locations of each first row of each K-group.

In any system herein, when the data from the memory unit is ready out as rotated data, it is provided to the processing engine which performs a portion a frequency transform on incoming rotated streaming data to the new processed data.

In any system herein, the new processed data is written back into same locations it was taken from the form read out data blocks.

Any system can be combined with a data acquisition (DAQ) device to produce the sampled streaming analog input data that is provided in K-deep input data blocks.

In any system herein, the data acquisition (DAQ) device can be an optical sensing array.

Also disclosed is a method for creating a frequency-based output data on a single chip from sampled streaming analog input data that is provided in K-deep input data blocks where K is a number of samples per clock cycle. The method includes: processing with a processing engine on the single chip the incoming streaming data as a series of K-deep input data blocks, wherein processing includes performing a portion a frequency transform on the incoming streaming data to produce processed data; storing with a memory controller processed data to initially be stored by column in a memory unit on the single chip; read data in the memory out in a rotated manner; provide the rotated data to the processing engine so that processing engine creates new processed data; and write the new processed data back into the memory.

The method can be implemented on any system disclosed above or otherwise herein.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
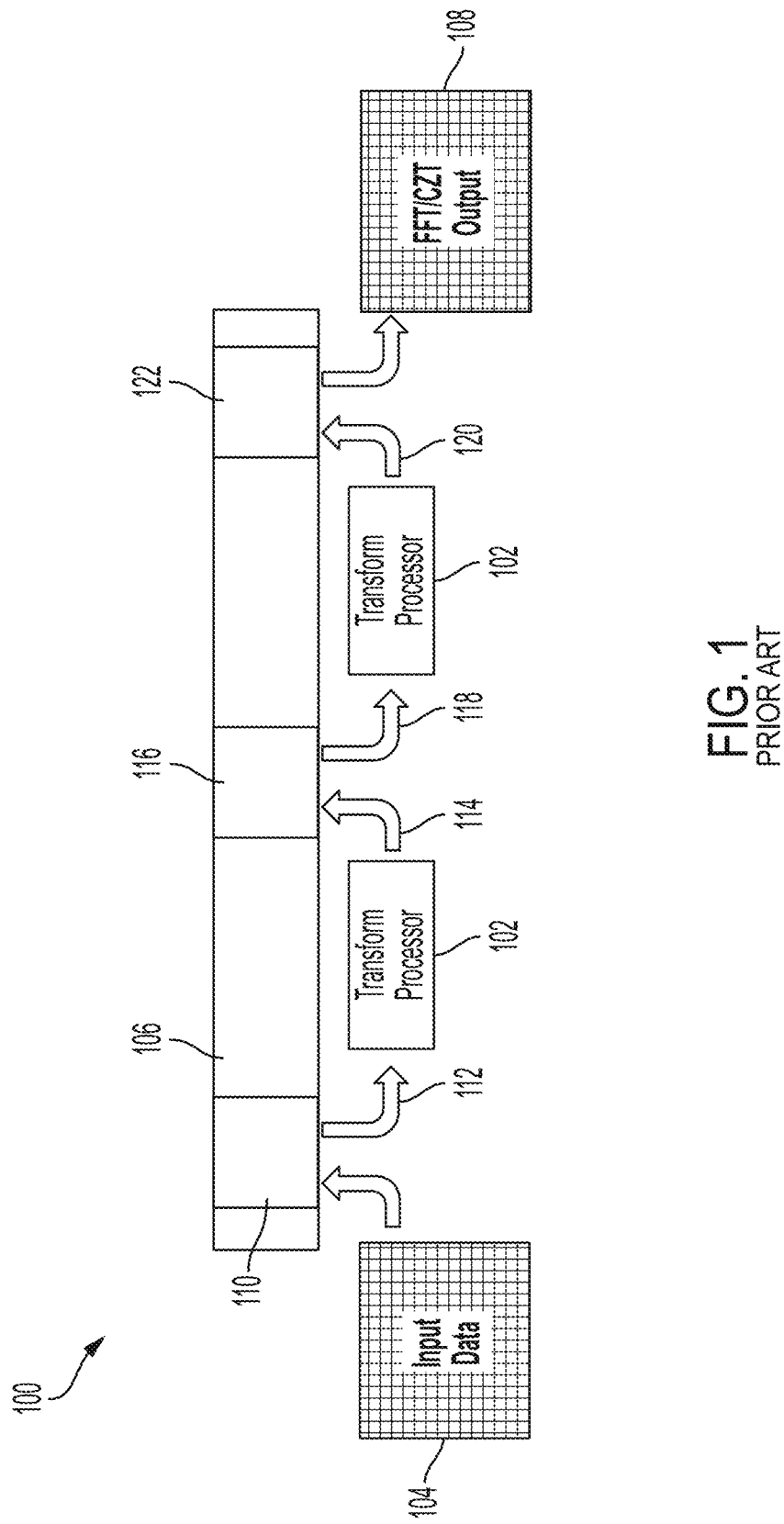
FIG. 1 shows an example of a prior art method of performing a streaming FFT/CZT.

FIG. 1 shows an example of how an FFT/CZT process is performed in the prior art. The process is performed by a system 100 that includes an FFT/CZT 102 processor (referred to a transform processor herein). In FIG. 1, there are multiple blocks shown as the transform processor 102. This could be, however, a single processor and is shown as multiple instances to signify the different memory accesses that are required.

The system 100 operates on input data 104 This data is sampled data from an input signal and can be stored, in the first instance, in high-bandwidth memory (HBM) 106. The input data 104 can transmitted as blocks of sampled data that are K-levels (bytes/words) deep where K is the number of samples per clock cycle output by a sampling device (not shown).

The initial load can be into a first region 110 of the HMB 106. In this example, assume that the data needs to be rotated before it is provided to the processor 102. The data in the first region 110 can read out in a rotated manner to form rotated data 112. The processor 112 operates on the rotated data and produces output data 114. This data is stored in a second region 116 in the HBM 106. The data in the second region 116 can read out in a rotated (or not) manner to form data 118. The processor 102 operates on the data 118 and produces output data 120. This data is stored in a third region 122 in the HBM 106. The data from the third region 122 can then be provided into an output memory location 108 for further processing. As seen from the above, even a simple two stage transform process can require significant access of large amounts of HBM that is "off chip" from the transform processor. Such accessing can slow the system and requires use of expensive HBM.

Disclosed herein is a system that allows for FFT/CZT computations to be executed "in place." That is, the computations can be done in the transform processor without having to access off-chip memory. This allows, for example, an FPGA with limited memory to recreate the process shown in FIG. 1 without having to utilize HBM 106.

In a first aspect, there is a system/method that utilizes "super sampled" FFTs in an "in-place" block processing structure to accomplish an M×N FFT/CZT of an incoming high bandwidth data stream with only internal FPGA memory. In context of a signal, the transform size will be of size M×N.

To that end, there is provided a parallel FFT/CZT memory architecture that allows for in-place block processing where an output of the transform overwrites input data in the memory of the transform processor. In one embodiment, the system can use smaller FFT/CZTs (of size M and N) to create a large 1D FFT/CZT (of size M×N).

Figure 2:
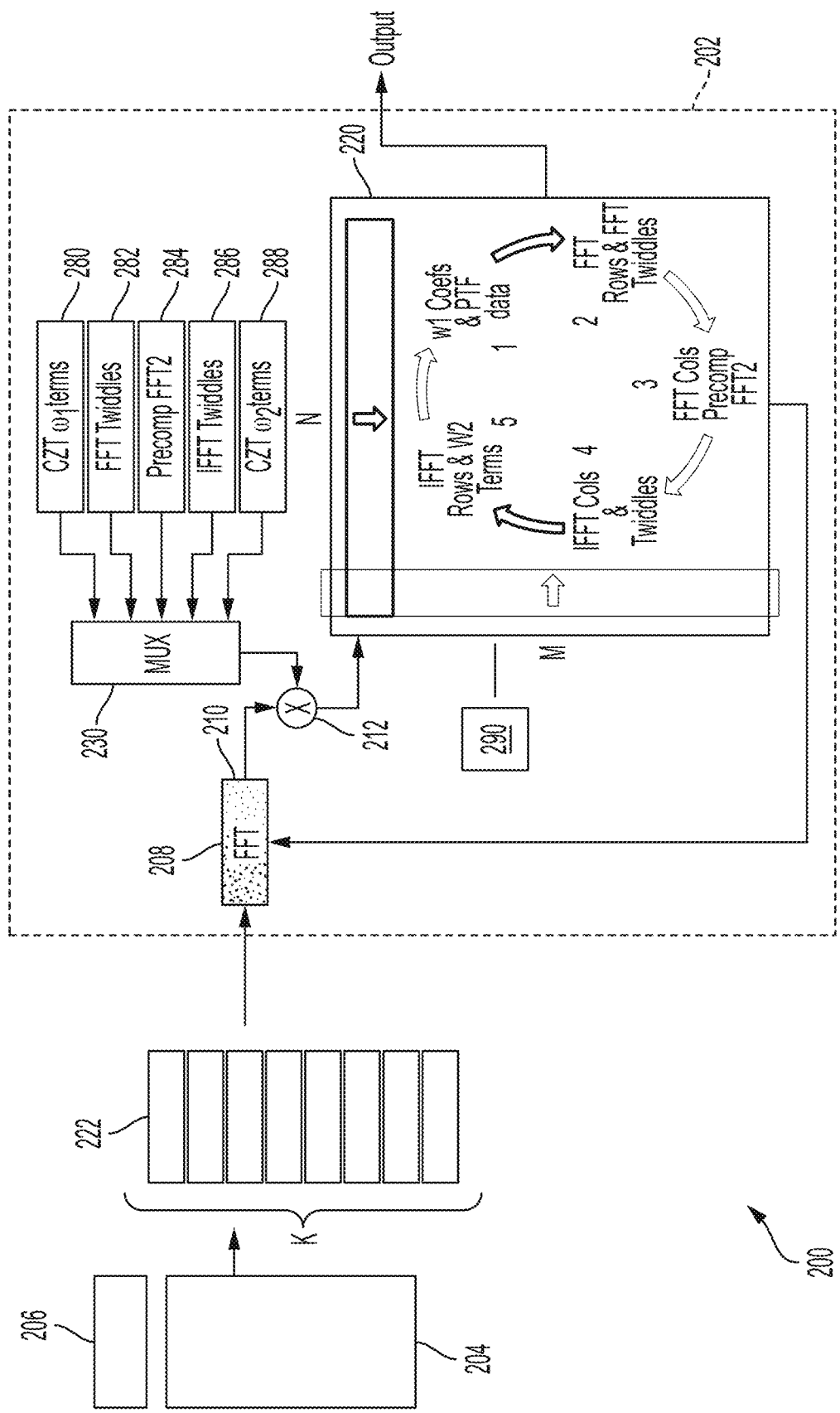
FIG. 2 shows a general system for performing in-place FFT/CZT transforms according to one embodiment.

FIG. 2 shows an example of a general system 200 according to one embodiment. The system 200 includes a transform processor 202. The transform processor 202 can perform the various stages of an FFT/CZT and create an output (e.g., output data 120 of FIG. 1). The output can be frequency-based representation of the input data. This data can be provided to further processing circuits (not shown) and/or provided to a human to analyze the data. For example, the output can be used for a guidance system in one embodiment that makes course corrections/decisions based on the output.

Depending on how many stages/operations are performed, the output data 120 can be either FFT or CZT data. It is noted that Bluestein's Fast Fourier Transform (FFT), commonly called the Chirp-Z Transform (CZT), is essentially a high-resolution FFT combined with the ability to specify bandwidth.

The transform processor 202 can include a processing engine 208 that can operate on the data in a per stage manner according to FFT/CZT processing stages. For brevity, it shall be simply noted that the processing engine 208 engine performs an FFT on data each sample it receives and outputs that data as processed data at its output 210.

The system 200 also includes a data acquisition (DAQ) device 204. The DAQ device 204 (input source) can be any type of device that acquires analog time domain signals from a source and converts to a digital output. The DAQ device 204 is shown as a standalone device, but it may include a sensor 206 either as part of it or that is separate that provides it with input signal. Example sensors include, but are not limited to, scanning arrays, acoustic sensors, vibration sensors, optical sensors and the like. While shown as including the data acquisition (DAQ) device 204, embodiments herein may be limited such that only the transform processor is required and data can be received from any location.

As in known in the art, the DAQ device 204 can output multiple samples per clock cycle. This data is a series of data elements that is K units deep where K is the number of samples output by DAQ device 204 in a clock cycle. K can be referred to as a polyphase factor herein. This is illustrated in FIG. 2 by one block of input data 222. The input data 222 will, of course, include a large number of blocks and will include a width that can be a small as a byte but is not so limited and will depend on the DAQ specification.

The input data 222 can be loaded into the on-chip memory 220 of the transform processor 202. As noted above, the transform processor 202 can be a FPGA in one embodiment. In one embodiment, the memory 220 can include at least M×N memory locations. According to embodiments herein, the data can be loaded in a particular manner such that it can read our either in the same manner as it was loaded or in a rotated manner depending on the needs of the next stage of the transform.

As data is provided from the DAQ device 204, it is provided to the processing engine 208 where it bypasses the FFT operation and is combined with initial CZT $\omega_1$ terms 280. These terms will depend on the desired bandwidth of the transform as is known in the art. The combination is shown as being a multiplied by multiplier 212. The output of the multiplier 212 is then stored in the "original" or "non-rotated" manner. For simplicity, the cycle of various data transforms is shown in by a circle in FIG. 2 with various stages. The data that has been multiplied by the CZT $\omega_1$ terms 280 is shown as being data at stage 1.

Next, the data stored in stage 1 is read out in a rotated manner and provided to the processing engine 208 where it is processed and then multiplied by FFT twiddles (twiddle factors) 282. The result is stored in the same manner it was read out and is indicated as data as stage 2.

Next, the data at stage 2 is read out in its current form (e.g., not rotated), operated on by the processing engine 208 and multiplied by pre-comp FFT2 factors 284 and stored as stage 3 data. Following that, the data is again read out in its unrotated form, operated on by the processing engine 208, multiplied by IFFT twiddles 286 and stored as stage 4 data. Lastly, the data is read out in a rotated form, operated on by the processing engine 208 and multiplied by CZT $\omega_2$ terms 288 and stored as stage 5 data. This represents a complete CZT if all 5 stages are computed, the output is CZT data. It will be understood that stage 3 data could be read out and would represent an FFT of the input samples.

The above example provided example operations where data was stored in the memory 220 and either read out rotated or in its original form. According to embodiments herein, the data is then written back in the same manner it was read out. The systems and method allow for this to happen in the memory 220. As noted above, this can result in fast processing and reduce or eliminate the need for HBM. To that end, a memory controller 290 is shown that caused memory to either be read out rotated or in its original form as needed. The controller 290 can include programming that informs such decisions based on which transform (FFT/CZT) is being performed. The controller 290 thus allows for implementation of a memory folding technique polyphase access to any row and column of an input data matrix in array of 1D memory. Stated differently, it allows for data to be retrieved either in its original format or rotated.

In FIG. 2, the memory is shown as having columns N and rows M. The typical read (un-rotated) is a columnar readout with each column N being sequentially read out. A rotated read/retrieval is a by row readout with each row M being sequentially read out.

As more fully shown below, the memory set up and storage system/method allows for rows or columns to be streamed in/out of the on-chip memory 220.

Figure 3:
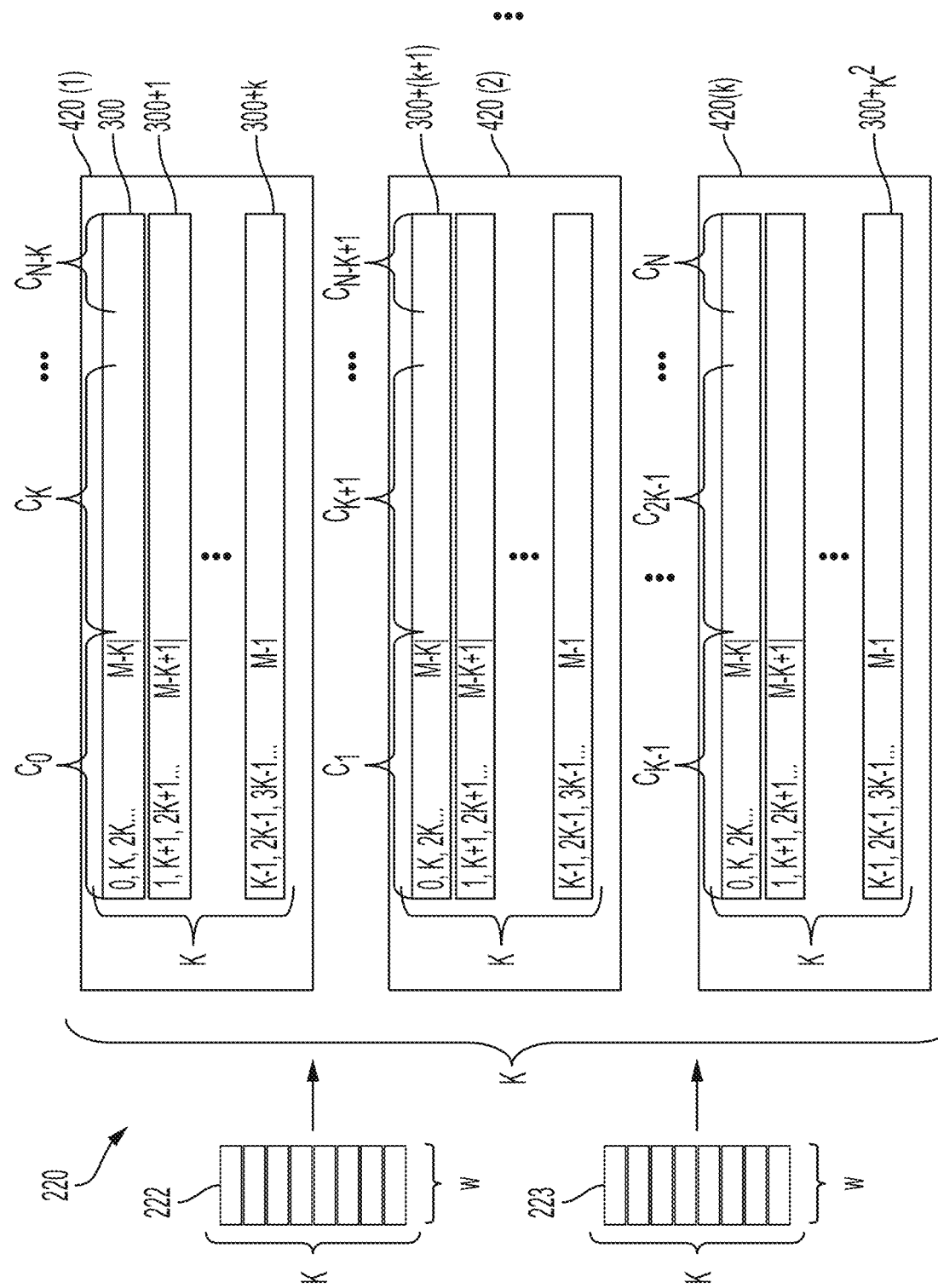
FIG. 3 shows an example memory set up used according to embodiments herein.

FIG. 3 shown as example of a memory 220 of one embodiment. The memory receives "super sampled" FFTs in an "inplace" block processing structure to accomplish an M×N FFT/CZT.

As indicated in FIG. 2, the memory 220 can be M×N in size where M=number of rows in memory 220 and N=number of columns. As noted above, K=is the number of samples in a single clock cycle output by the DAQ device 204 and is referred to as the polyphase factor herein and is the same as the super sample rate of the FFTs.

In FIG. 3, the memory 220 is shown as being configured as groupings of 1D memory. In particular, there can be K×K individual 1D memory units $300 \ldots 300k^2$ in one embodiment. The memory will be loaded in a unique manner. The units are grouped into k-groups where each k group includes k 1D memory units. As shown in FIG. 3, the k-groups are labelled 420(1) ... 420(k) for each of reference but any convention can be used.

Consider either the first load or any load following an un-rotated read. In such cases, the input data is provided into a portion of the memory 220 designated as $C_0$. For completeness is it noted that there will be at least $C_{N/K}$ portions in the memory.

Region $C_0$. includes portions of row 300 to row 300+k. In each portion C, there are M locations used where each block was the same width as the input data 222. Thus, in one embodiment, each row 300 is at least $MN/K^2$ locations long with each location being equal to at least a width (w) of the input data 222.

The first data block received will be put in locations 0 to K−1 indicated in FIG. 3. The next data block received will be put in locations K to 2K−1 indicated in FIG. 3. This is repeated until $C_0$ is filled and is all the data in the first column M of the FFT After block $C_0$ is filled, the next column of data will be put in the next K group down (422(2)) in the first portion (labelled as $C_1$). This portion will be filled as explained above. This loading then progresses until the last k group 420(k) where portion $C_{k-1}$ is filled in the same manner as above. Then the next block that is to be filled is the first k group 420(1) in the portion labelled $C_K$. This process then goes on until the last column is loaded into portion $C_N$.

To read out "unrotated" data, each successive portion will be streamed. In particular, the process will start by streaming out the first location of each row 300 in the first portion $C_0$. The output data block 223 will be the same size as the example input data 222. This is repeated for each successive location in $C_0$ until all data in the first portion is streamed out. By way of example, the first instantiation of the data block 223, as labelled in FIG. 3, will include the data location 0 in row 300, location 1 in row 300+1, ... location K−1 in row 300+K. The second instantiation of the data block 223, as labelled in FIG. 3, will include the data location K in row 300, location K+1 in row 300+1, ... location 2K−1 in row 300+K. For example, the streaming will start with the parallel read of locations 0 to K−1. This continues until the column $C_0$ is fully ready out. Then the following portion ($C_1$) and so on is read out until all columns are read out.

To read out "rotated" data, output blocks 223 are created that take each successive location in each successive portion (C). Stated differently, Polyphase Row data can be accessed by indexing locations in the memory 222 according to the Row #Modulo K of each K group and addressing across C groups until row data is complete. The following discussion will reference FIGS. 4a-4e where the output data is shown as successive blocks 223a, 223b etc.

Figure 4A:
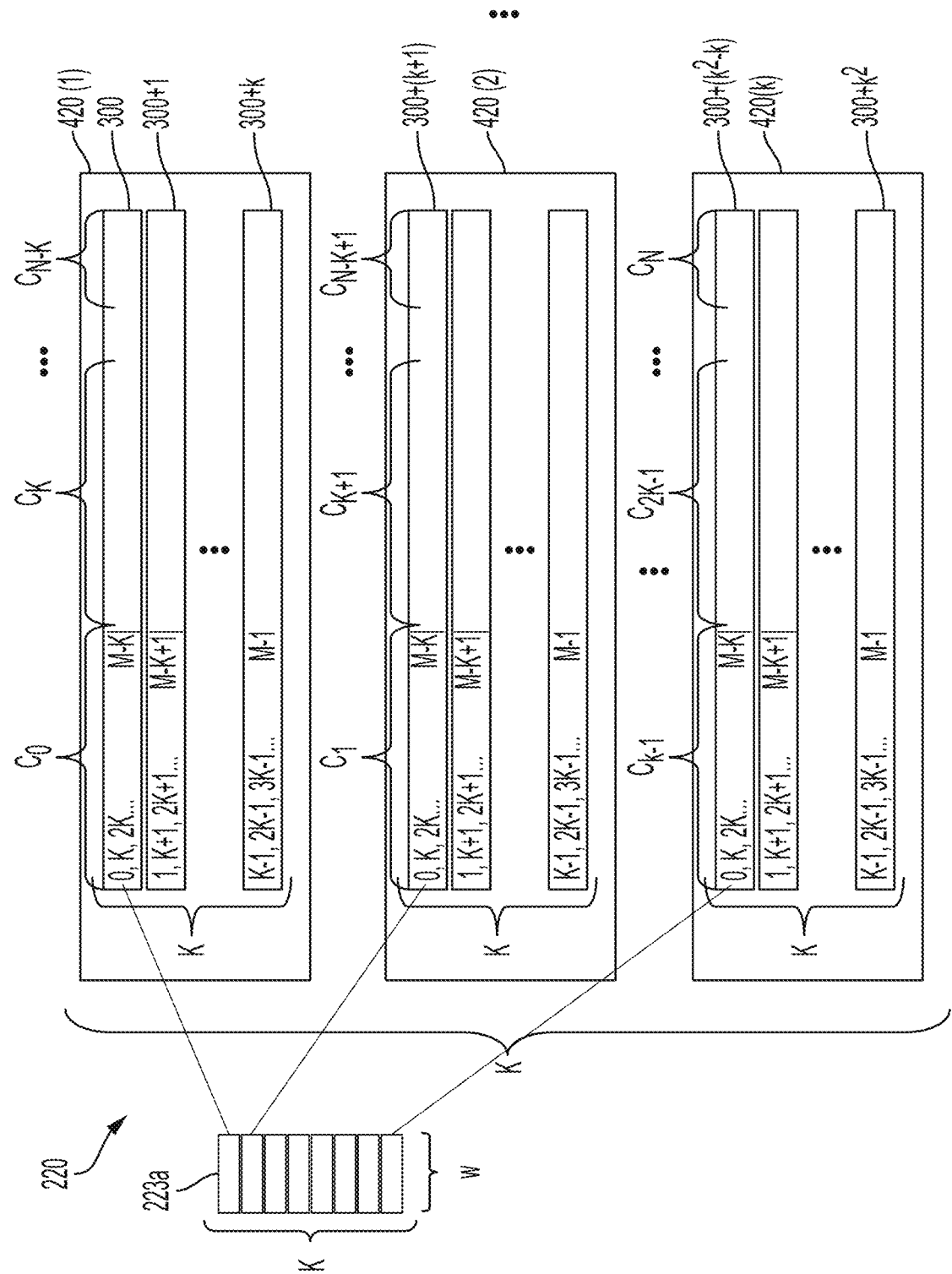
FIGS. 4a-4e show various methods of writing and reading the memory.

In one embodiment, the process will start, as shown in FIG. 4a, by streaming out the first location (0) of the first row (e.g, rows, 300, 300+(k+1), 300+($k^2$−k)) of each K group. Stated differently, the first location in each portion $C_0$ to $C_{k-1}$ is used to form the first output block 223a.

Figure 4B:
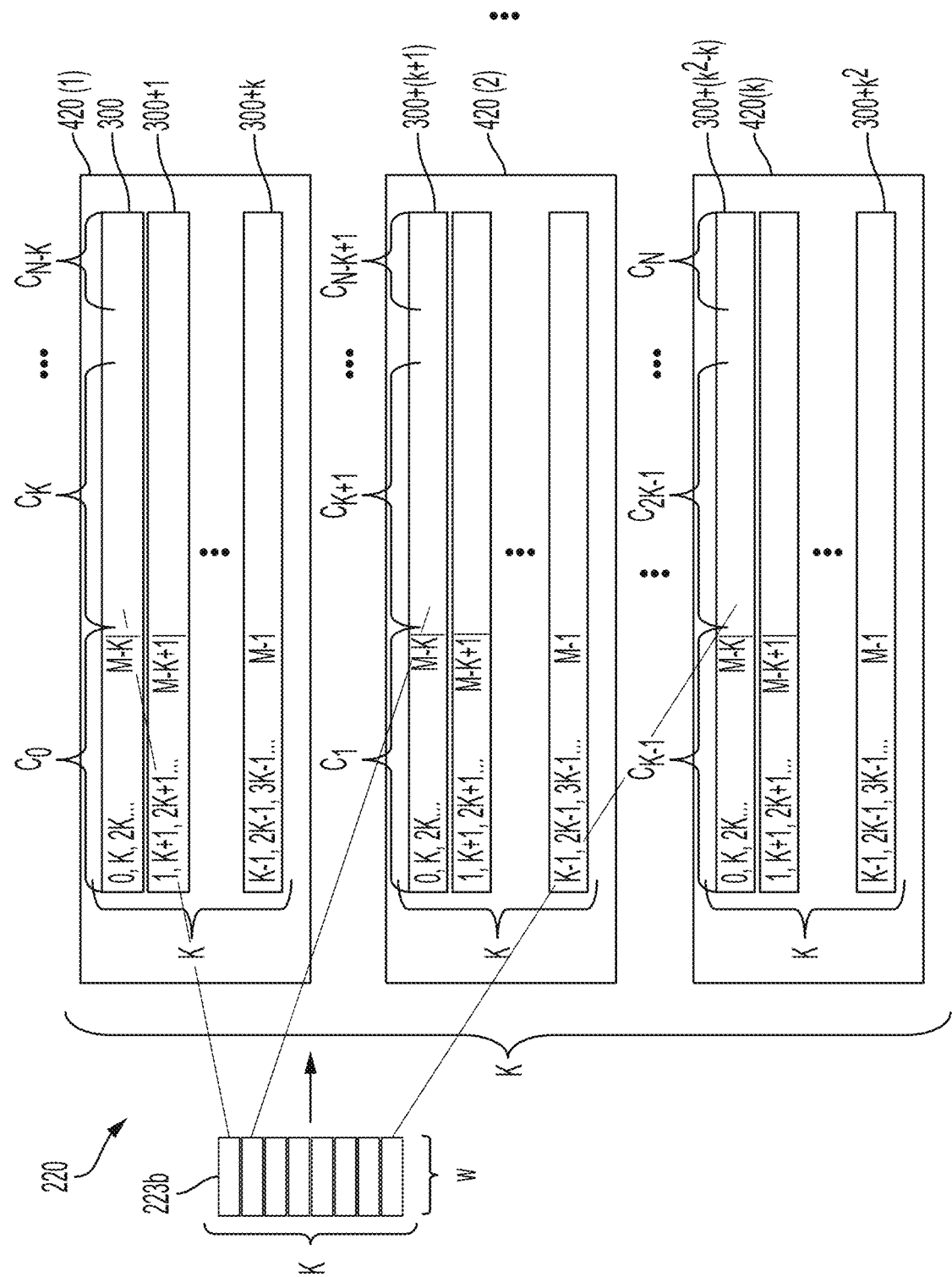

Next, as shown in FIG. 4b, the first location in each portion $C_1$ to $C2_{k-1}$ is used to form the second output block 223b. This process continues until all such first locations in the first rows of each k group are read out.

Figure 4C:
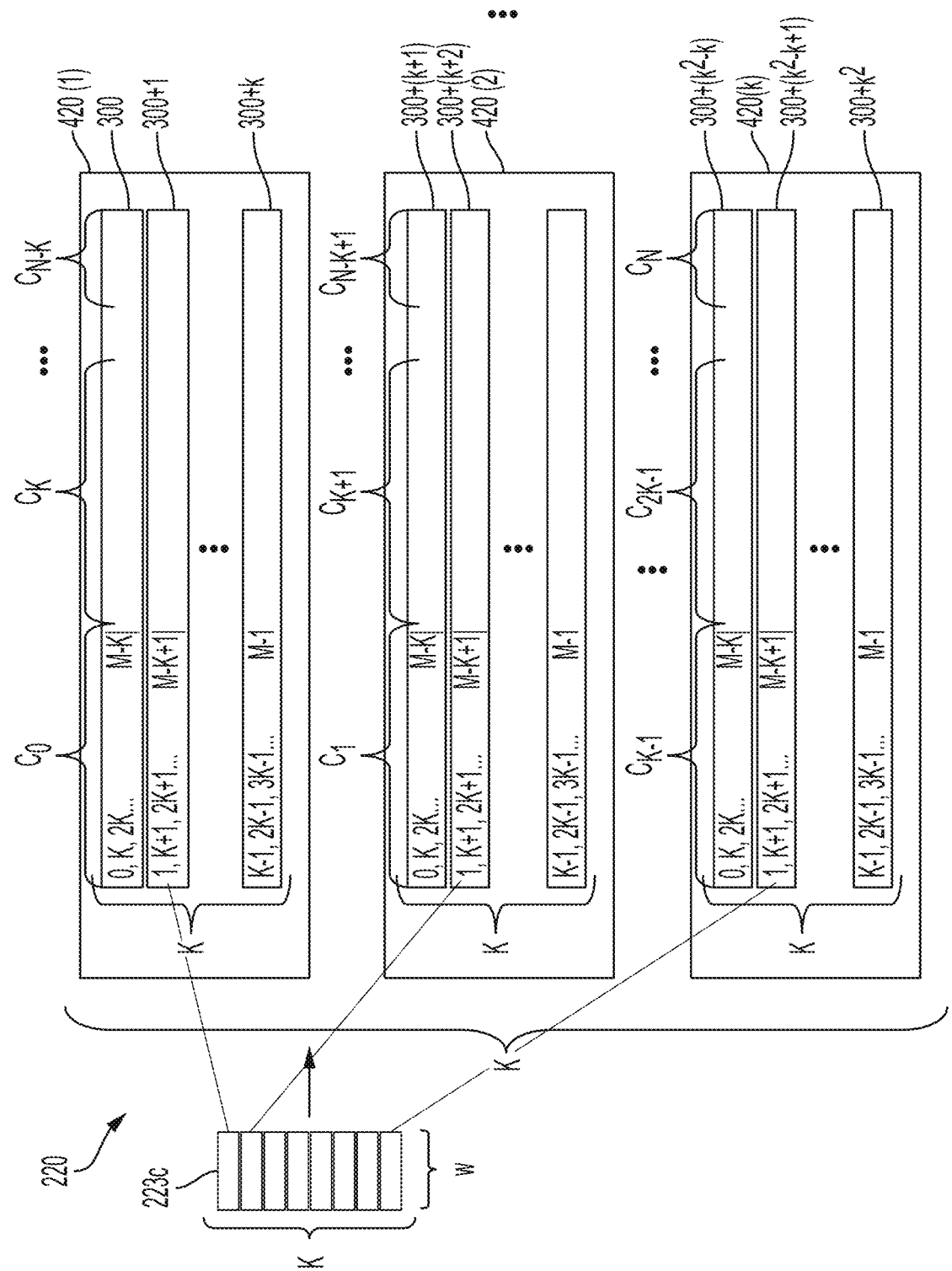

Then, the same process is repeated but by starting and operating in the second row 330 in each K group 420. As shown in FIG. 4c, this may include streaming out the first location (1) of the second row (e.g, rows, 300+1, 300+(k+2), 300+($k^2$−k+1)) of each K group. Stated differently, the first location in second row of each portion $C_0$ to $C_{k-1}$ is used to form the first output block 223c.

Figure 4D:
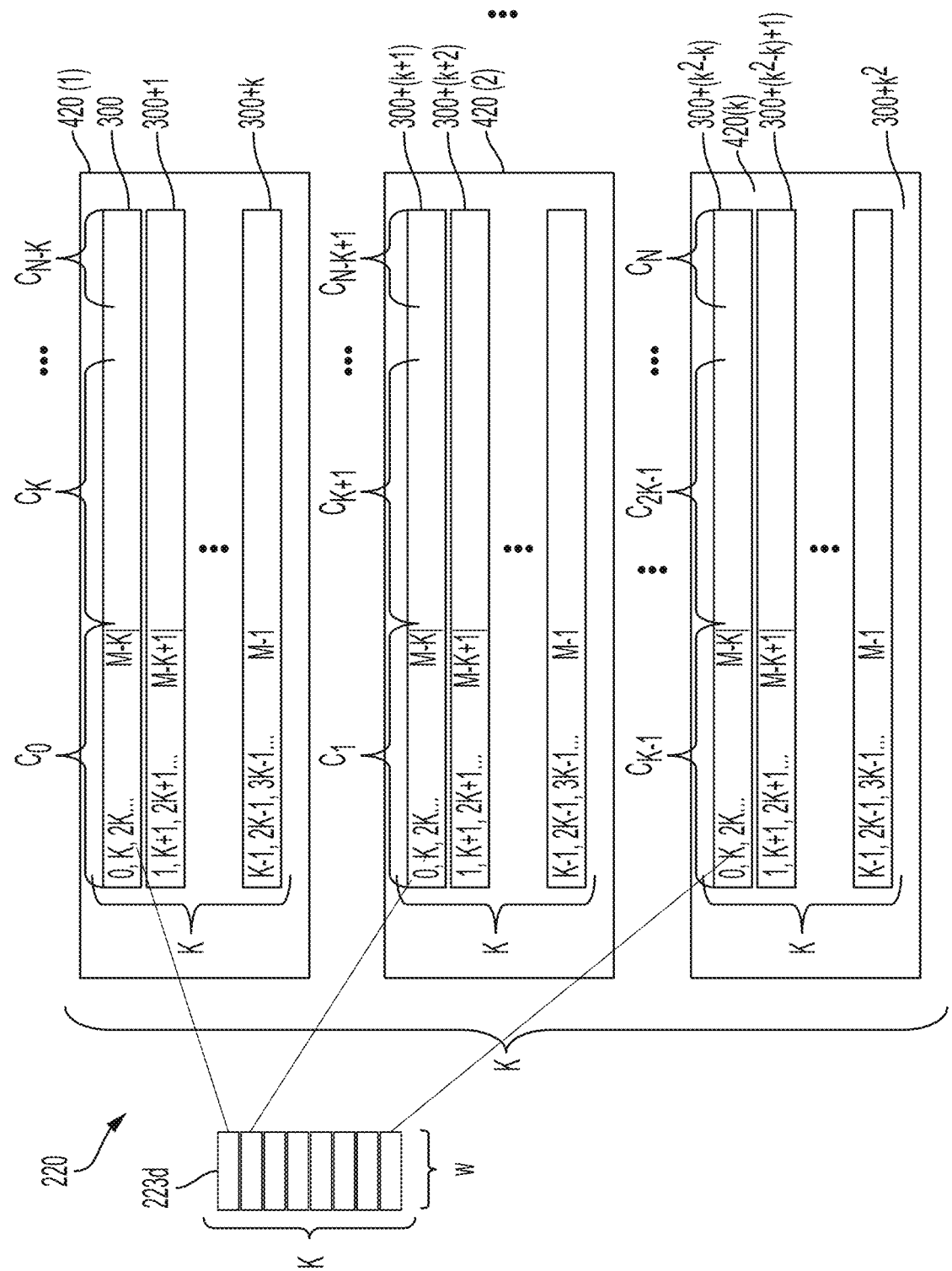
Figure 4E:
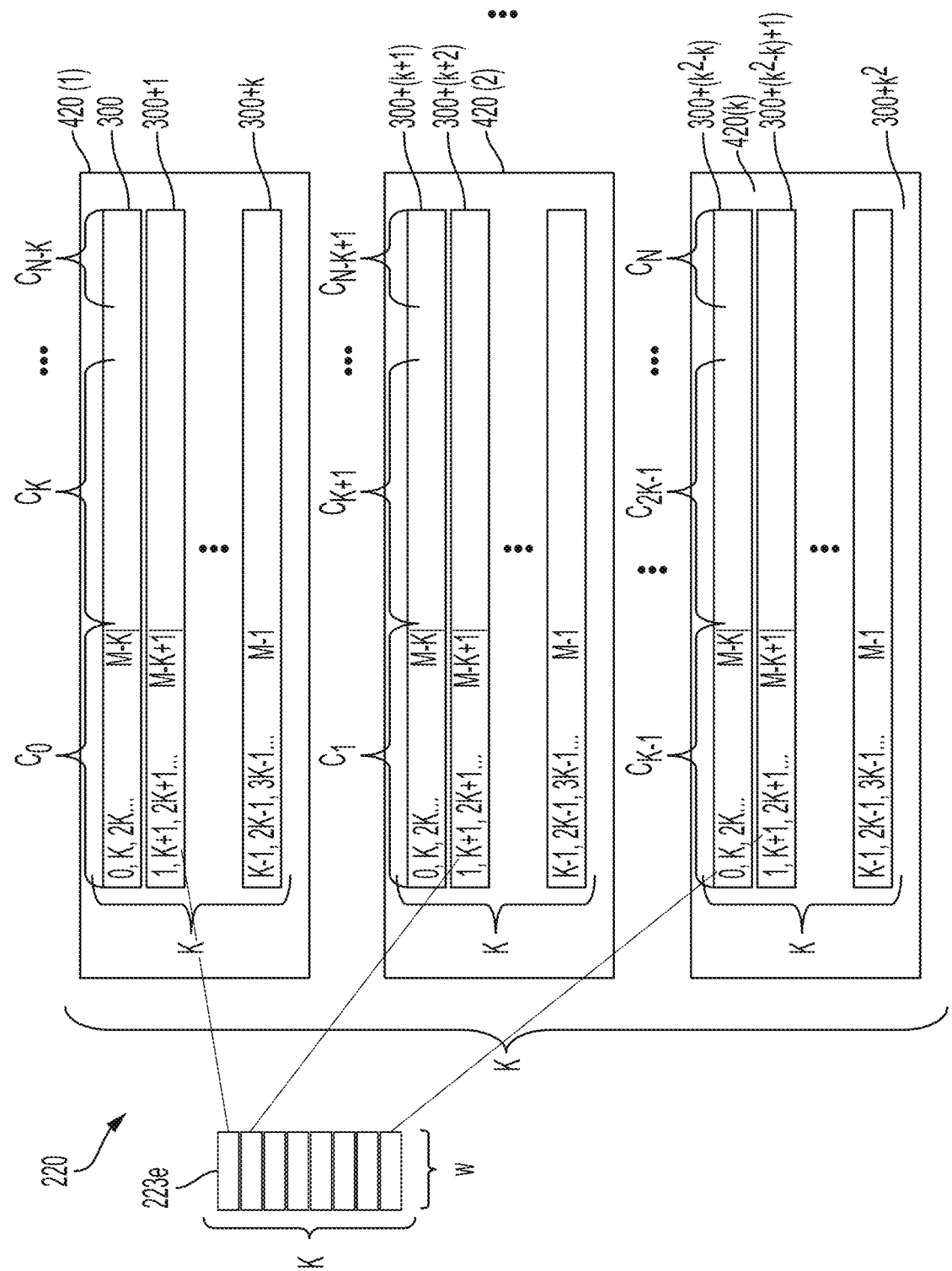

After all of the "first" positions in all of the rows in all of the portions (C) have been read out, the processing then moves to reading out the second location in the first row of each column. For example, as shown in FIG. 4d, this can include streaming out the second location (K) of the first row (e.g., rows, 300, 300+(k+1), 300+($k^2$−k)) of each K group. Stated differently, the second location in each portion $C_0$ to $C_{k-1}$ is used to form the output block 223d. As above, and as shown in FIG. 4e, block 223e is formed by streaming out the second location (K+1) of the second row (e.g, rows, 300+1, 300+(k+2), 300+($k^2$−k+1)) of each K group.

The above described process can be performed until all data is read out. After being process by the processing engine 208, the data is loaded back into the same locations it was streamed from. For instance, assuming the data was read out in the "rotated" manner, the first data received back would be put into the locations from which output block 223a was taken from.

As can be seen from the above, data can be put in one manner and read out in a rotated or un-rotated manner according to the systems and methods described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for exemplary embodiments with various modifications as are suited to the particular use contemplated.

While the exemplary embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A processing circuit on a single chip for creating a frequency-based output data from sampled streaming analog input data that is provided in K-deep input data blocks where K is a number of samples per clock cycle, the system comprising:
    a memory unit on the single chip to store data including the sampled streaming analog input data;
    a processing engine on the single chip that receives the incoming streaming data as a series of K-deep input data blocks and performs a frequency transform on a portion of the incoming streaming data to produce processed data; and
    a memory controller that causes the processed data to initially be stored by column in the memory unit, wherein the memory controller is configured to read data in the memory out in a rotated manner, provide it to the processing engine so that processing engine creates new processed data and write the new processed data back into the memory.

2. The system of claim 1, wherein the memory unit includes at least MxN memory locations where M is a number of rows in the memory unit and N is the number of columns in the memory unit.

3. The system of claim 2, the memory includes K K-groups of memory elements, wherein each K-group includes K-rows of 1-D memory, wherein each K-group is divided into N/K portions and wherein a first memory portion (Co) of a first of the K-groups includes M memory locations.

4. The system of claim 3, wherein the processed data is written into the first memory portion ($C_0$) such that each successive data block is written in a successive location of each of the K–1D memory elements.

5. The system of claim 4, wherein after the ($C_0$) is full, the processed data is written into a second memory portion ($C_1$) such that each successive data block is written in a successive location of each of the K-1D memory elements in the second memory portion, wherein the second memory portion is a second of the k-groups.

6. The system of claim 5, wherein the memory unit includes CN portions, wherein after each successive ($C_2 \ldots C_{(K-1)}$) memory is full, each successive data block is written in a successive location of each of the K–1D memory elements in the successive memory portion until a last memory portion $C_N$ is filled.

7. The system of claim 6, wherein the memory controller is configured to read out stored data from the memory unit as either un-rotated or rotated data.

8. The system of claim 7, wherein when the data from the memory unit is read out as rotated data, a first read out data block that includes K data elements is formed by reading first locations of each first row of each K-group.

9. The system of claim 8, wherein when the data from the memory unit is ready out as rotated data, a second read out data block that includes K data elements is formed by reading Mth locations of each first row of each K-group.

10. The system of claim 9, wherein when the data from the memory unit is ready out as rotated data, it is provided to the processing engine which performs a portion a frequency transform on incoming rotated streaming data to the new processed data.

11. The system of claim 10, wherein the new processed data is written back into same locations it was taken from the form read out data blocks.

12. The system of claim 1, in combination with a data acquisition (DAQ) device to produce the sampled streaming analog input data that is provided in K-deep input data blocks.

13. The system of claim 12, wherein the data acquisition (DAQ) device is an optical sensing array.

14. A method for creating a frequency-based output data on a single chip from sampled streaming analog input data that is provided in K-deep input data blocks where K is a number of samples per clock cycle, the method comprising:
    processing with a processing engine on the single chip the incoming streaming data as a series of K-deep input data blocks, wherein processing includes performing a frequency transform on a portion of the incoming streaming data to produce processed data;
    storing with a memory controller processed data to initially be stored by column in a memory unit on the single chip;
    read data in the memory out in a rotated manner;
    provide the rotated data to the processing engine so that processing engine creates new processed data; and
    write the new processed data back into the memory.

15. The method of claim 14, wherein the memory unit includes at least M×N memory locations where M is a number of rows in the memory unit and N is the number of columns in the memory unit.

16. The method of claim 15, the memory includes K K-groups of memory elements, wherein each K-group includes K-rows of 1-D memory, wherein each K-group is divided into N/K portions and wherein a first memory portion ($C_0$) of a first of the K-groups includes M memory locations.

17. The method of claim 16, wherein the processed data is written into the first memory portion ($C_0$) such that each successive data block is written in a successive location of each of the K–1D memory elements.

18. The method of claim 17, wherein after the ($C_0$) is full, the processed data is written into a second memory portion ($C_1$) such that each successive data block is written in a successive location of each of the K-1D memory elements in the second memory portion, wherein the second memory portion is a second the k-groups.

19. The method of claim 18, wherein the memory unit includes $C_{N/K}$ portions, wherein after each successive ($C_2 \ldots C_{(N-K)}$) memory is full, each successive data block is written in a successive location of each of the K-1D memory elements in the successive memory portion until a last memory portion $C_{(N)}$ is filled.

20. The method of claim 19, wherein when the data from the memory unit is ready out as rotated data, a first read out data block that includes K data elements is formed by reading first locations of each first row of each K-group.

21. The method of claim 20, wherein when the data from the memory unit is ready out as rotated data, a second read out data block that includes K data elements is formed by reading Mth locations of each first row of each K-group.

* * * * *